United States Patent
Wang

(10) Patent No.: US 10,059,253 B1
(45) Date of Patent: Aug. 28, 2018

(54) ATV DAYTIME RUNNING LIGHT CONTROL

(71) Applicant: Zhejiang CFMOTO Power Co., Ltd., Hangzhou, Zhejiang (CN)

(72) Inventor: Junxian Wang, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 0 days.

(21) Appl. No.: 15/699,793

(22) Filed: Sep. 8, 2017

(30) Foreign Application Priority Data

Feb. 24, 2017 (CN) .......................... 2017 1 0104333

(51) Int. Cl.
| | |
|---|---|
| *B60Q 1/00* | (2006.01) |
| *B60Q 1/14* | (2006.01) |
| *B60Q 1/08* | (2006.01) |
| *B60Q 1/115* | (2006.01) |
| *B60Q 1/30* | (2006.01) |
| *B60Q 1/28* | (2006.01) |
| *B62K 5/01* | (2013.01) |

(52) U.S. Cl.
CPC .............. *B60Q 1/143* (2013.01); *B60Q 1/085* (2013.01); *B60Q 1/115* (2013.01); *B60Q 1/28* (2013.01); *B60Q 1/30* (2013.01); *B60Q 2300/112* (2013.01); *B60Q 2400/30* (2013.01); *B62K 5/01* (2013.01)

(58) Field of Classification Search
CPC .............. B60Q 1/143; B60Q 2300/112; B60Q 2300/116; B60Q 2300/21; B60Q 2300/314; B60Q 2400/30; B60Q 1/0076; B60Q 1/085; B60Q 1/1461; B60Q 1/18; B60Q 1/441; B60Q 2300/054; B60Q 2300/056; B60Q 2300/11
See application file for complete search history.

(56) References Cited

U.S. PATENT DOCUMENTS

| | | |
|---|---|---|
| 4,686,423 A | 8/1987 | Eydt |
| 5,646,485 A | 7/1997 | Simon et al. |
| 7,613,327 B2 | 11/2009 | Stam et al. |
| 9,227,556 B2 | 1/2016 | Longueville et al. |

*Primary Examiner* — Monica C King
(74) *Attorney, Agent, or Firm* — Shewchuk IP Services, LLC; Jeffrey D. Shewchuk

(57) ABSTRACT

An ATV or UV without a body control module includes a daytime running light control module. Daytime running lights are turned on when the engine speed, as indicated by the ECU microprocessor, is equal to or greater than a threshold and when each of the standard and bright headlights and right and left turn indicator lights are off. Otherwise the daytime running lights are turned off. If desired, the microcontroller performing the daytime running light control method may be the same microcontroller which controls the starter motor relay.

20 Claims, 2 Drawing Sheets

ATV DAYTIME RUNNING LIGHT CONTROL

CROSS-REFERENCE TO RELATED U.S. APPLICATION(S)

None.

FIELD OF THE INVENTION

The present invention relates to daytime running lights in vehicles, and particularly to control of daytime running lights in offroad vehicles such as UVs and ATVs which have no body control module or other electronic control unit responsible for monitoring and controlling various electronic parts in a vehicle's body.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement. In general, such UVs and ATVs have a lower price point and are considerably smaller and simpler than on-road vehicles such as passenger automobiles and trucks. In particular, such UVs and ATVs have no body control module ("BCM") or other highly capable microprocessor based control unit responsible for monitoring and controlling a wide array of electronic parts in the vehicle's body.

The use of daytime running lights ("DRLs") is well known in passenger automobiles and trucks, usually operated using the vehicle's headlamps under the control by the BCM. (Typically in passenger automobiles and trucks the BCM also controls the power windows, power mirrors, air conditioning, immobilizer system, central locking, etc., all of which are absent on UVs and ATVs.) The purpose of DRLs is not for lighting the road in front of the vehicle being driven, but rather for a safety purpose of making the vehicle being driven more noticeable to other drivers. DRLs in on-road vehicles are widely believed to effectively reduce traffic accidents. Research statistics suggest that the use of DRLs in on-road vehicles can reduce traffic accidents by 12.4% and can reduce traffic deaths by 26.4%. Examples of DRLs in on-road vehicles are shown in U.S. Pat. Nos. 4,686,423, 5,646,485, 7,613,327 and 9,227,556, incorporated by reference. Energy consumption of DRLs in on-road vehicles (which have a significantly higher electrical footprint than UVs and ATVs, as well as more readily available fuel) is not often considered.

DRLs have not been as widely adopted in UVs and ATVs, in part because UVs and ATVs are driven in locations (trails and fields) where interaction and avoidance of other vehicles is much less frequent, and in part because there is no BCM to control the DRLs. With the lower frequency of benefit, the energy consumption of the DRLs comes at a relatively higher price to the operation and cost of the UV or ATV. Additionally, drivers of on-road vehicles stay predictably on paved surfaces, whereas the travel paths of UVs and ATVs are not as predictable, which introduces other considerations to the operation of DRLs. Better solutions are needed, and particularly DRL strategies that are customized and focused on UVs and ATVs.

BRIEF SUMMARY OF THE INVENTION

The present invention is a daytime running light control method and module specifically configured for an ATV or UV without a body control module, and an ATV or UV using the daytime running light control method. While the method can also be performed without a separate microcontroller, the module includes a microcontroller separate from the microcontroller in the engine control unit (ECU). The daytime running lights are turned on when the engine speed, as indicated by the ECU microprocessor, is equal to or greater than a threshold and when each of the headlights and right and left turn indicator lights are off. Otherwise the daytime running lights are turned off. If desired, the microcontroller performing the daytime running light control method may be the same microcontroller which controls the starter motor relay. The invention simultaneously achieves the objects of energizing the daytime running lights when most needed by others to maximize noticing the ATV or UV while it is travelling, and minimizing energy consumption when the daytime running lights would not increase safety.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
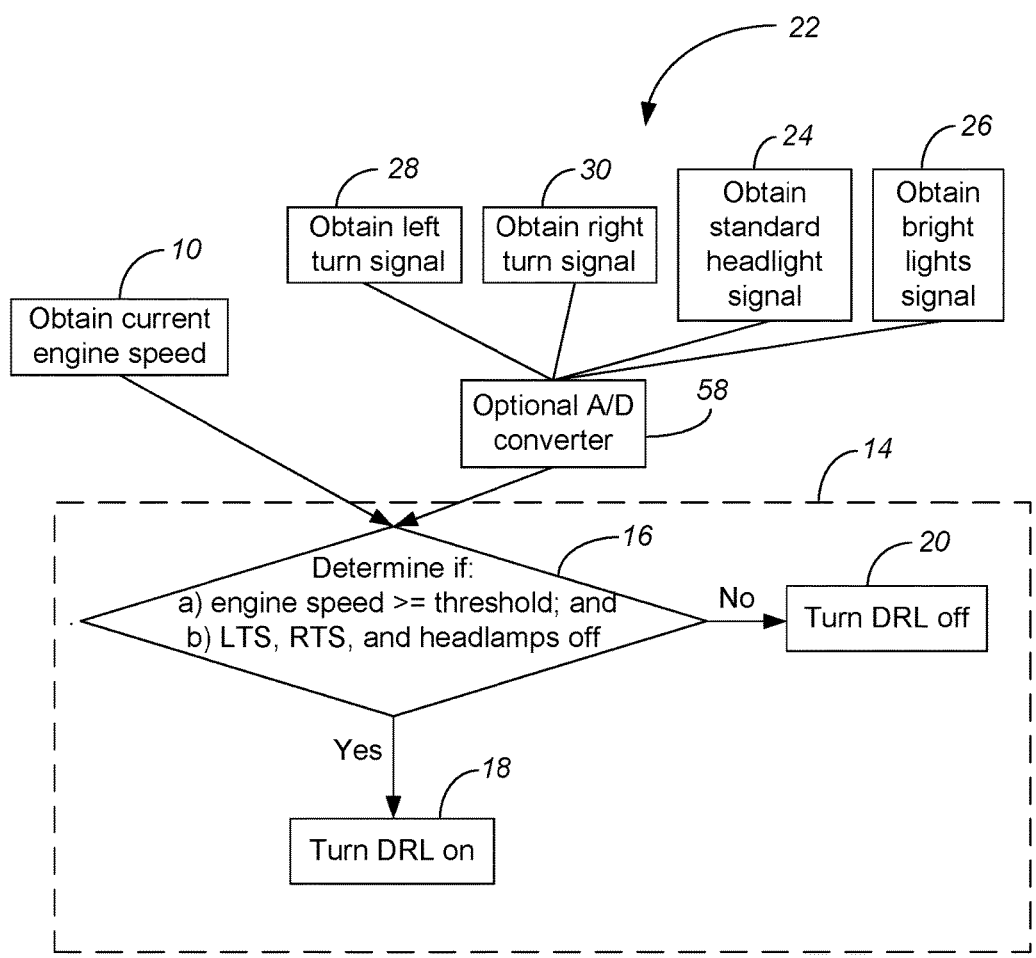
FIG. 1 is a flow chart showing a DRL control method of a first embodiment of the present invention.

The present invention provides a DRL control method particularly beneficial for UVs and ATVs. In one important aspect, the DRL control method only turns the DRLs on during the most advantageous time periods during use of the vehicle, conserving battery power/fuel during other time periods and driving conditions when the DRLs would provide little or no benefit. As shown in FIG. 1, the preferred DRL control method utilizes two basic inputs, the operating speed of the engine and the on/off status of other lights on the vehicle. Thus, a first step 10 in the preferred embodiment is to obtain the current operating speed of the engine.

The operating speed of the engine 10 may be acquired, for instance, from a data register in an engine control unit 12 (ECU, shown in FIGS. 2 and 3) having an integrated circuit micro-processor chip which maintains a revolution per minute (RPM) value as part of controlling the engine. The DRL control logic 14 performs a determination 16 based in part on whether the current engine speed exceeds a threshold, as one of the determining factors as to whether to turn the DRLs on 18. The threshold RPM value is preferably selected to be higher than an idle speed of the engine, but lower than essentially all engine speeds when the engine torque is propelling the vehicle, or propelling the vehicle with a significant speed. The idle speed and driving speeds of the engine may change somewhat from engine model to engine model and/or from vehicle to vehicle, and accordingly the threshold RPM value is selected as appropriate for any particular engine/vehicle. In one preferred embodiment, for instance, for a ATV or UV with an engine idle speed in the range of 300 to 400 RPMs and a preferred power delivery in the range of 500 to 1200 RPMs, the threshold RPM value is 500 RPMs or more, i.e., the DRLs 36 (shown in FIGS. 2 and 3) will not be turned on 18 unless the engine speed is at least 500 RPMs.

Generally speaking, the threshold RPM value is selected such that the vehicle is not moving, or moving quite slowly, when the current speed of the engine is lower than the threshold RPM value. When the vehicle is not moving or only moving very slowly, the DRLs 36 provide little or no benefit toward their role of increasing the identification of the vehicle by other drivers. By keeping the DRLs off 20 when the current speed of the engine is lower than the threshold RPM value, energy consumption is reduced as compared to prior art DRL strategies, beneficial toward lower fuel consumption, toward better battery charge maintenance (particularly in conditions when the vehicle key is in the "on" position but the engine is not running, keeping the DRLs off 20 increases the time period before the battery can no longer turn the starter motor), and toward greater battery longevity.

In another preferred embodiment, the determination 16 regarding the current engine speed establishes an upper value for the DRL control method as well, such as determining whether the current engine speed is in the speed range of 1000±500 RPM, i.e. in the range of 500 to 1500 RPM. Using 1500 RPM upper threshold value of current engine speed for the DRL control method is appropriate in cases when the engine essentially only reaches such high speeds with little or no resistance on rotation of the wheels, such as when the vehicle is on blocks during maintenance, or when it is being driven above a desired RPM operating range of the vehicle, such as overly gunning the engine while the vehicle is stuck in mud or with one or more driven wheels airborne, with the wheel freely rotating or slipping with no traction. In either of these instances, the vehicle is not moving and therefore there is no need for DRLs despite having a current engine speed over 500 RPM. Like the 500 RPM lower threshold value, the 1500 RPM upper threshold is selected as appropriate for any particular engine/vehicle, with the 500-1500 RPM range being just provided as one example.

As shown in FIG. 1, a second step 22 in the preferred embodiment is to obtain the operating status of various lights on the body of the vehicle. In this case, the preferred ATVs and UVs using the present invention have exterior lighting components which include standard (a/k/a passing-beam) headlights 24, bright (a/k/a driving-beam) headlights 26, and right and left turn signal lamps 28, 30. For such a vehicle, the preferred DRL control method 14 obtains 22 the operating status of each of these four types of lights. The determination step 16 of the preferred DRL control method 14 will only energize/illuminate 18 the DRLs 36 when the left direction indicator lamp 28, the right direction indicator lamp 30, the driving-beam headlamps 26 and the passing-beam headlamps 24 are all switched off.

Generally speaking, if the driver has moved the switch 32 (shown in FIGS. 2 and 3) to turn either the standard or bright headlights on, then those headlights 24, 26 themselves will perform the function of enabling other drivers to better identify the vehicle, and there is little or no additional value to having the DRLs 36 on. Similarly, if the driver has moved the blinker switch 34 (shown in FIGS. 2 and 3) to signal a turn, then the blinking of the right or left direction indicator lamp 30, 28 will perform the function of enabling other drivers to better notice the vehicle. Keeping the DRLs off 20 whenever any of these lights 24, 26, 28, 30 are on conserves power (fuel) without any downgrade of safety. Moreover, many ATVs and UVs locate the DRLs 36 in close proximity to the right or left direction indicator lamp 28, 30. Extinguishing 20 the DRLs 36 whenever the driver signals a turn enables other drivers and pedestrians to better see the blinking turn indication lamp 28, 30 without visual interference from the DRLs 36, thus improving the safety of the vehicle.

Figure 2:
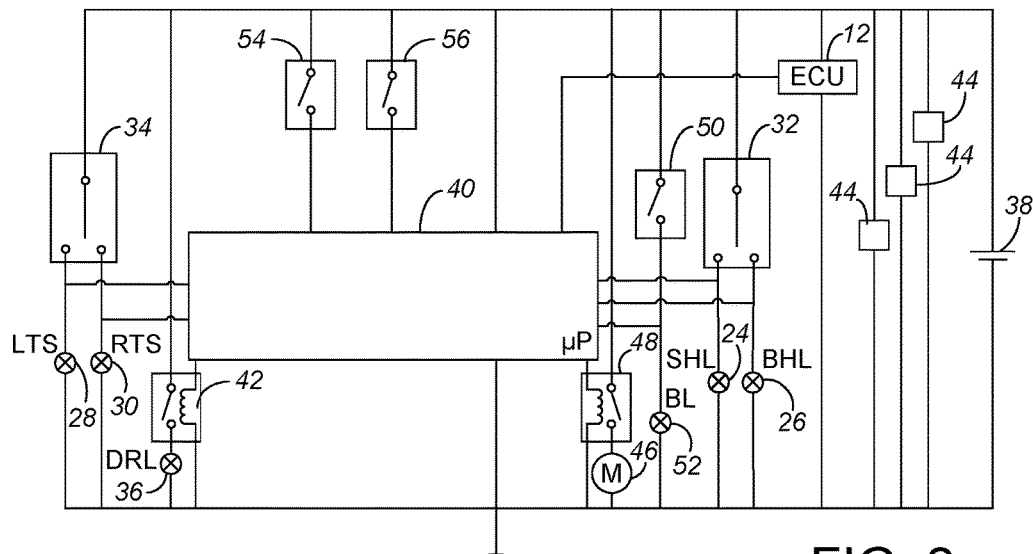
FIG. 2 is a simplified electrical schematic showing a DRL control structure and method of a second embodiment of the present invention.

FIG. 2 shows a simplified circuit view of a preferred DRL control module relative to the electrical system of the vehicle. The vehicle electrical system for the ATV or UV includes a battery 38 and an ECU 12 for the engine. The DRL control module includes a simple integrated circuit microprocessor chip 40, with a signal port electrically connected to a digital output of engine speed from the ECU 12, thus allowing the first step 10 of the DRL control method. The microprocessor chip 40 includes power ports electrically connected to the positive and negative/ground electrodes of the battery 38 (with any power supply circuit for the microprocessor chip 40 omitted for simplicity). The vehicle electrical system includes one or two switches 32, accessible to the driver in the cab of the vehicle, for turning the headlights 24, 26 on and switching between standard and bright modes. The outputs of this switch(es) 32 are electrically connected to the DRL microprocessor chip 40, allowing consideration of the headlight portion of the second step of the DRL control method. The vehicle electrical system also includes a blinker switch 34, accessible to the driver in the cab of the vehicle, for turning the turn signal indicator lamps 28, 30 on (blinking). The outputs of this blinker switch 34 are also electrically connected to the DRL microprocessor chip 40, allowing consideration of the turn signal portion of the second step 22 of the DRL control method. (Any electrical components to convert or control the electrical signals from each of these switches 32, 34 to an appropriate current or voltage analog signal and/or to a digital signal for use on the DRL microprocessor chip 40 are omitted for simplicity, and in any event would likely depend upon the particular microprocessor chip being used). When the current engine speed exceeds the threshold and each of the headlights 24, 26 and turn indicator lights 28, 30 are off, the DRL microprocessor chip 40 provides a signal which energizes a DRL relay 42, switching 18 the DRLs 36 of the vehicle on. Otherwise the DRLs 36 of the vehicle remain off 20 and unilluminated.

Other electrical components may also be included on the vehicle (such as at a minimum the starter motor 46 and other unnamed electronic components 44 such as the distributor/electronic ignition/spark plug circuit) which have no bearing on the preferred DRL control method 14 of the present invention.

In the most preferred embodiment, the DRL control method is implemented within the microprocessor chip 40 already in use on the vehicle for controlling the starter motor relay 48. A normally open starter relay 48 is controlled and switched on only when the vehicle meets the desired starting conditions, thereby preventing the driver from forcibly or mistakenly engaging the starter motor 46 and avoiding violent and damaging collision between the starter motor 46 and the starting gear of the engine. In the preferred ATVs and UVs, the starter motor 46 cannot be energized unless the driver is pressing on the brake pedal (energizing the switch 50 for the brake light 52) and the vehicle is in neutral gear or the clutch is disconnected. Accordingly, the preferred DRL microprocessor chip 40 is also electrically connected to the parking (key in the starting position) switch 54, to the gear/clutch switch 56 (indicating when the vehicle is in neutral gear or the clutch is disconnected), and the brake light switch 50. By utilizing the microprocessor chip 40 already in use on the vehicle for controlling the starter motor relay 48, the DRL control method 14 of the present invention adds essentially no cost to the vehicle.

In an embodiment shown in FIG. 1, instead of connecting analog signals for each of the four lights 24, 26, 28, 30 to the DRL microprocessor chip 40, the four analog signals may be fed to an analog to digital converter 58 which outputs a single digital signal to the DRL microprocessor chip 40, telling the DRL microprocessor chip 40 whether any of the four lights are energized. Providing only digital signals, which can be at significantly lower voltages and/or at lower current, to the DRL microprocessor chip 40 eases wiring requirements on the vehicle and enables tapping into the vehicle's electrical wiring system at numerous alternative locations, either on the power side or the ground side of each of the switches 32, 34, 50, 54, 56 and/or either on the power side or the ground side of each of the lights 24, 26, 28, 30.

In an alternative embodiment, instead of using the current engine speed as a basic input to the DRL control method, the DRL control method utilizes the current vehicle speed such as from the speedometer of the vehicle, only allowing the DRLs 36 to turn on when the vehicle is moving, or when the vehicle is moving faster than a speed threshold, such as faster than 10 miles per hour or 15 km per hour. Using the vehicle speed rather than the engine speed is beneficial because there is no calibration or resetting of the threshold needed based on idle speed of that particular model/vehicle. The downside of using the vehicle speed rather than the engine speed is that the ECU 12 for the engine typically only monitors engine conditions, not vehicle speed, and there may be no convenient output on the speedometer for obtaining a digital value of vehicle speed (particularly when using an analog speedometer, which may have no electrical signal at all).

Figure 3:
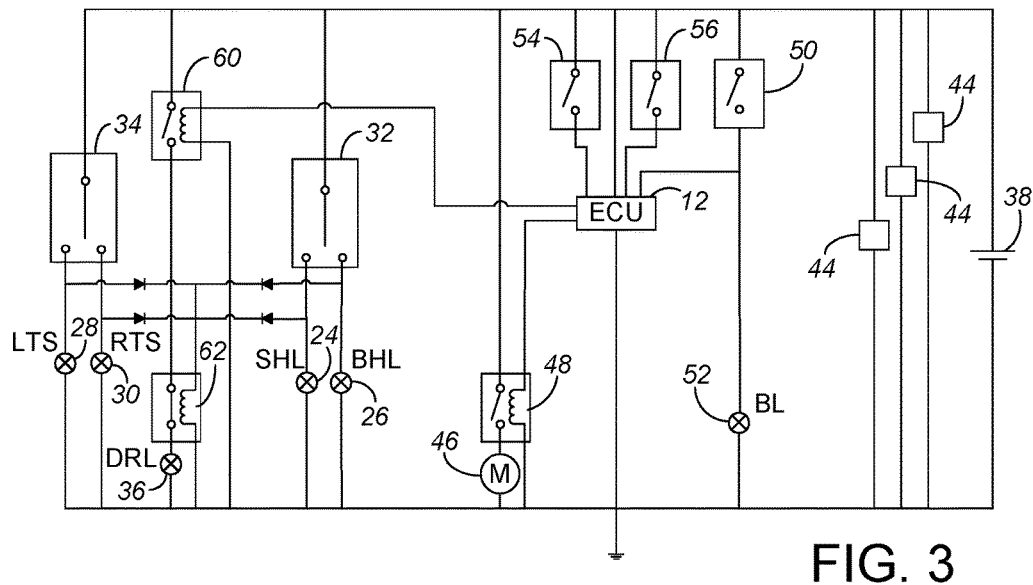
FIG. 3 is a simplified electrical schematic showing a DRL control structure and method of a third embodiment of the present invention.

In one alternative embodiment shown in FIG. 3, the DRL control method of the present invention is employed without any microprocessor other than in the ECU 12. Instead of obtaining the current engine speed from the ECU 12 and performing the determining step in an integrated circuit microprocessor chip 40 of a DRL module, the threshold value(s) are programmed into the ECU 12. The ECU 12 then outputs a control signal closing a normally open relay 60 on the circuit for the DRLs 36 whenever the engine speed equals or exceeds the threshold. The power signals for the various lights 24, 26, 28, 30 can then be used to open a normally closed relay 62 on the circuit for the DRLs 36.

The DRL control method and structure of the present invention is simpler and less costly than many DRL control methods used in vehicles with BCMs, and at the same time provides energy savings as compared to other DRL control methods which always energize the DRLs during operation of the vehicle. At least one type of light (i.e., one of the standard headlamps 24, the bright headlights 26, a blinking turn indicator light 28. 30, or the DRLs 36) is on any time the vehicle is significantly moving, but the DRLs 36 are turned off 20 whenever any of the other lights 24, 26, 28, 30 are on (for energy savings, and for greater safety when signaling turns) and the DRLs 36 are turned off 20 whenever the vehicle is not significantly moving (for energy savings and longer component and battery life).

Although the present invention has been described with reference to preferred embodiments, workers skilled in the art will recognize that changes may be made in form and detail without departing from the spirit and scope of the invention.

The invention claimed is:

1. A daytime running light control method for a vehicle, comprising:
    obtaining an engine speed of the vehicle, the vehicle having an electrical system including headlights, right and left turn indicator lights and daytime running lights;
    obtaining an on/off condition for each of the headlights and right and left turn indicator lights; and
    turning the daytime running lights on when the engine speed is equal to or greater than a threshold and each of the headlights and right and left turn indicator lights are off, and turning the daytime running lights off when the engine speed is less than the threshold and any of the headlights and right and left turn indicator lights are on.

2. The daytime running light control method of claim 1, wherein the vehicle is an all terrain vehicle without a body control module or a utility vehicle without a body control module.

3. The daytime running light control method of claim 2, wherein the engine speed is obtained from a microprocessor in an engine control unit.

4. The daytime running light control method of claim 1, wherein the threshold is faster than an idle speed of the vehicle.

5. The daytime running light control method of claim 1, wherein the threshold is 500 revolutions per minute.

6. The daytime running light control method of claim 1, further comprising turning the daytime running lights off when the engine speed exceeds an upper threshold.

7. The daytime running light control method of claim 6, wherein the vehicle is an all terrain vehicle without a body control module or a utility vehicle without a body control module, and wherein the upper threshold indicates that at least one wheel is rotating without the vehicle moving.

8. The daytime running light control method of claim 6, wherein the upper threshold is 1500 revolutions per minute.

9. The daytime running light control method of claim 1, wherein a determination of whether to turn the daytime running lights on or off is performed in a microprocessor that controls a starter motor relay.

10. The daytime running light control method of claim 9, wherein the microprocessor controls the starter motor relay based upon a parking switch, a gear/clutch switch and a brake switch.

11. A daytime running light control module for a vehicle having an electrical system including headlights, right and left turn indicator lights and daytime running lights, the daytime running light control module comprising:
    a microprocessor having:
        at least one input for obtaining an engine speed of the vehicle;
        at least one input for obtaining an on/off condition for each of the headlights and right and left turn indicator lights; and
        an output for controlling the daytime running lights;
    wherein the daytime running light control module turns the daytime running lights on when the engine speed is equal to or greater than a threshold and each of the headlights and right and left turn indicator lights are off, and wherein the daytime running light control module turns the daytime running lights off when the engine speed is less than the threshold and when any of the headlights and right and left turn indicator lights are on.

12. The daytime running light control module of claim 11, wherein the threshold is 500 revolutions per minute.

13. The daytime running light control module of claim 11, wherein the daytime running light control module turns the daytime running lights off when the engine speed exceeds an upper threshold.

14. The daytime running light control module of claim 13, wherein the upper threshold is 1500 revolutions per minute.

15. The daytime running light control module of claim 13, wherein the microprocessor also controls a starter motor relay.

16. An all terrain vehicle or a utility vehicle without a body control module, comprising:
an engine; and
an electrical system including headlights, right and left turn indicator lights and daytime running lights,
wherein the daytime running lights are automatically turned on when the engine speed is equal to or greater than a threshold and each of the headlights and right and left turn indicator lights are off, and wherein the daytime running lights are automatically turned off when the engine speed is less than the threshold and when any of the headlights and right and left turn indicator lights are on.

17. The vehicle of claim 16, further comprising an engine control unit (ECU) with an ECU microprocessor, and wherein the determination of whether to turn the daytime running lights on or off is performed in a separate microprocessor than the ECU microprocessor, which separate microprocessor obtains an engine speed from the ECU microprocessor.

18. The vehicle of claim 17, wherein the threshold is faster than an idle speed of the vehicle.

19. The vehicle of claim 18, wherein the daytime running lights are automatically turned off when the engine speed exceeds an upper threshold, wherein the upper threshold indicates that at least one wheel is rotating without the vehicle moving.

20. The vehicle of claim 19, wherein the separate microprocessor also controls a starter motor relay based upon a parking switch, a gear/clutch switch and a brake switch.

* * * * *